United States Patent

[11] 3,592,141

| [72] | Inventor | Mats I. Davidson<br>Nygarden, Ganghester, Sweden |
|---|---|---|
| [21] | Appl. No. | 762,539 |
| [22] | Filed | Sept. 25, 1968 |
| [45] | Patented | July 13, 1971 |

[54] CONVEYING DEVICE
26 Claims, 30 Drawing Figs.

| [52] | U.S. Cl. | 104/88 |
|---|---|---|
| [51] | Int. Cl. | B61j 3/00 |
| [50] | Field of Search | 104/88 |

[56] References Cited
UNITED STATES PATENTS

| 2,714,355 | 8/1955 | Benson | 104/88 |
|---|---|---|---|
| 3,126,837 | 3/1964 | Noye | 104/88 |
| 3,209,896 | 10/1965 | Roberts | 104/88 X |

*Primary Examiner*—Donald F. Norton
*Attorney*—Linton and Linton

ABSTRACT: The device is for conveying objects such as semifinished products between different working stations in a transfer line and the personnel at any of the different working stations can direct a selected number of the semifinished products to other working stations in the transfer line by the manual actuation of a keyboard.

INVENTOR
MATS I. DAVIDSON

CONVEYING DEVICE

This invention refers to a conveying device, including a continuously driven main line and second lines, connected thereto and leading to and from different transfer stations, such as working and inspection stations.

Conveyor systems of the kind referred to are already known in several types. Anyhow there does not exist today a conveyor, which offers a real solution to the transport problems inherited in manufacturing systems of a more flexible character.

The main object of the invention is to provide a universally applicable device which is simple in its construction and in which the objects to be transferred between the different stations may be automatically transferred to selected stations at the same time as the personnel at the different stations may redirect one or several of the objects to other available stations.

Other objects and advantages of the new conveyor device will be apparent from the specification and the drawings and the characteristics of the invention will be apparent from the claims.

The drawings illustrate a preferred embodiment of the invention as well as some details of the same. In the drawings:

FIG. 3 shows in an end view and partly in section the construction of the main lines, while FIG. 4 shows in an enlarged scale a portion of the upper line, partly in section.

FIG. 17 is a plan view of a portion of the main line with a loading device and a loading arm.

FIG. 18 is a diagrammatical end view of a device for preventing an overloading of a second line, while FIG. 19 shows the same device in a side view.

FIG. 28 is a perspective view of a part of loading apparatus while

Figure 1:
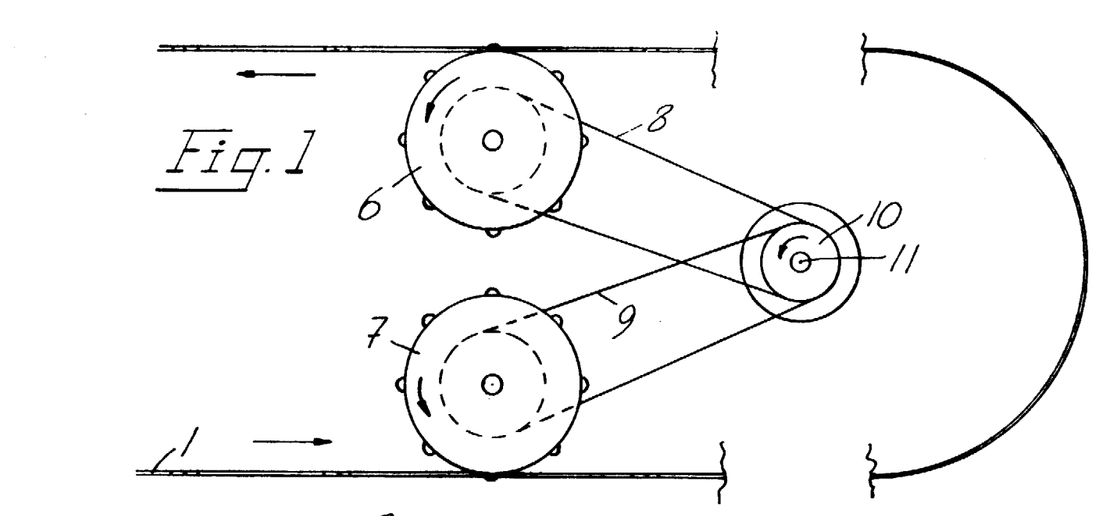
FIG. 1 is a top view of driving means for the main line or lines.
Figure 2:
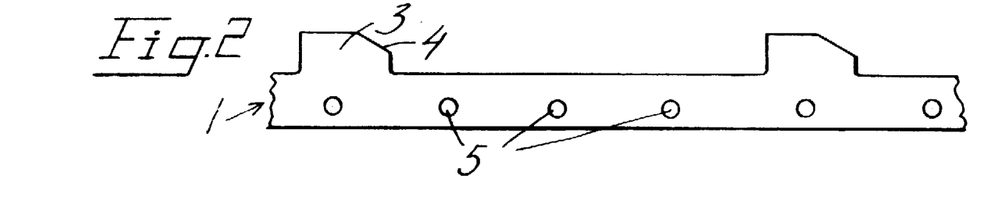
FIG. 2 shows in a front view of a portion of the drive belt, illustrated in FIG. 1.
Figures 3, 4:
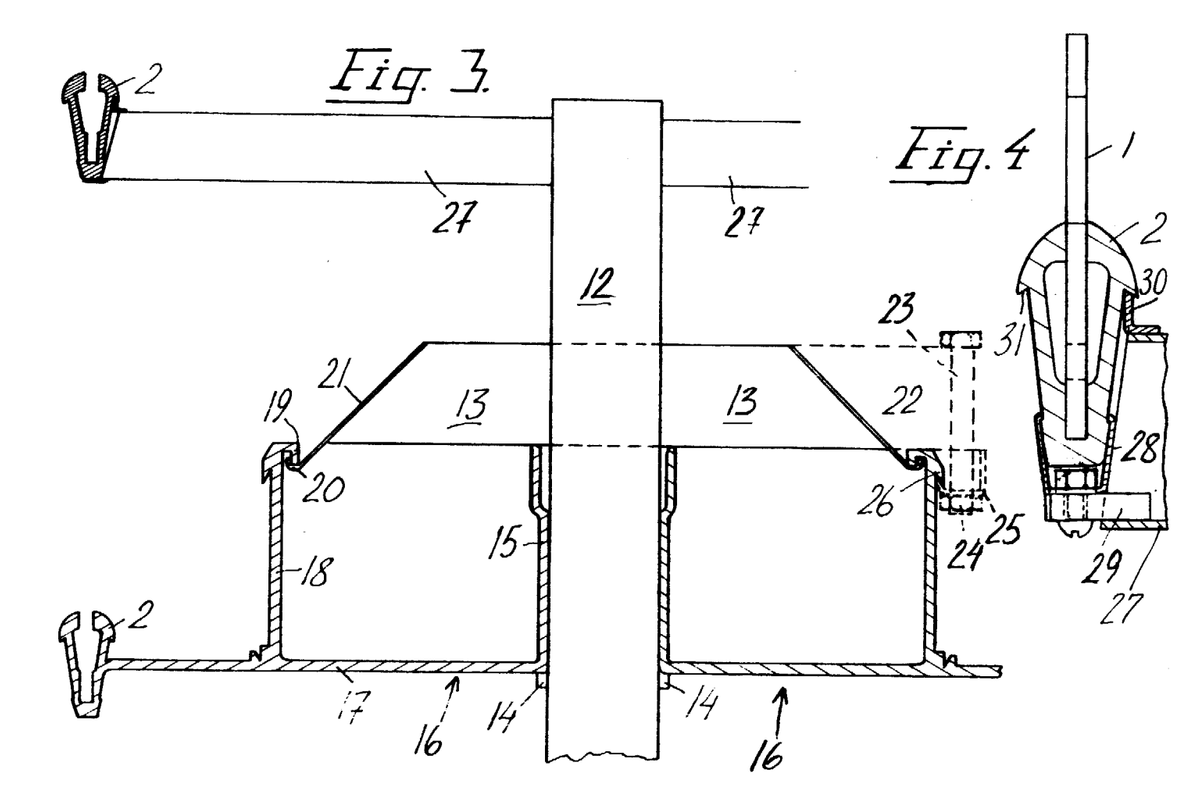

Generally the new conveying device includes a continuously feeding main line, which in principle consists of a belt 1, made from a relatively rigid material with low friction coefficient such as acetal plastic resin and being guided in a guiding profile 2, shown in FIGS. 3 and 4, which determines the extension of the conveying path. The belt 1, has dogs 3 which at their forward end are provided with a bevelled portion 4. Along it s entire length the belt is provided with perforations 5 for cooperation with preferably semispherical feed teeth of two sprockets 6 and 7 for driving the belt. In order to move the belt in the desired path, which as will be apparent from FIG. 1 may have relatively sharp bends and with a small amount of power, the driving of the belt is given a pushing as well as a pulling force by means of the sprockets 6, 7, which for this purpose act each upon its part of the belt and are driven synchronously for example by means of belts 8 and 9 from a pulley 10, keyed to the drive shaft of a vertically arranged engine (not shown). The drive shaft 11 may, in the embodiment with two main lines, adapted one above the other, as shown, drive both these lines.

The conveying device is according to FIG. 3 supported by a number of columns 12, provided with crossbars 13 welded to the columns which also have projections 14, between which may be fitted the vertical leg 15 of profile bars 16, to the horizontal legs of which is connected a vertical portion 18, which in its upper end terminates in a hook portion 19 and also a terminal portion 2, in the shape of the guiding profile 2, already mentioned, for the conveyor belt 1. Obviously it is possible to secure the profile bars 16 in their positions as shown by fastening clamping plates 21 having belled lips 20 to the sloping edge of the crossbar by means of screws or the like. The profile 16 bars 16 in turn support outriggers 22 for supporting the second lines and means belonging to the same. As the outriggers like the crossbar 13 have sloping edges with clamping plates 20, 21 it is seen that the outriggers may be easily hooked over the hook portions 19 of the profile bar and then secured by means of a bolt 23, shown in dotted lines in FIG. 3, which passes through the outrigger 22 and may hold a clamping plate 25 in engagement with a hook element 26 of the other profile 16 by means of a nut 24. The end portions 2 of the profiles 16 constitute, as mentioned, guides for the belt 1, but this is only applicable to the straight part of the path. In the bent portions of the path there is only, as in the upper line in FIG. 3 an end profile 2, which may be bent to the desired shape. From FIG. 4 it is apparent that the end profile 2 of the upper line is made separate and it is also apparent how it by means of clamping elements 28 is secured to a crossbar 27, projecting from the column 12. The elements 28 in turn are secured to plates 29, welded to the interior of the cross bar 27, which is in the shape of a tube with rectangular section. By means of angle brackets 30 secured to the crossbar 27 and engaging notches 31 in the profiles 2 the latter are held in position. In utilizing these construction characteristics a conveying device suited for any demand may be rapidly and easily built up. The number of outriggers 22 as well as the distances between them may thus be varied at will at the same time as the fastening is very simple.

Figure 5:
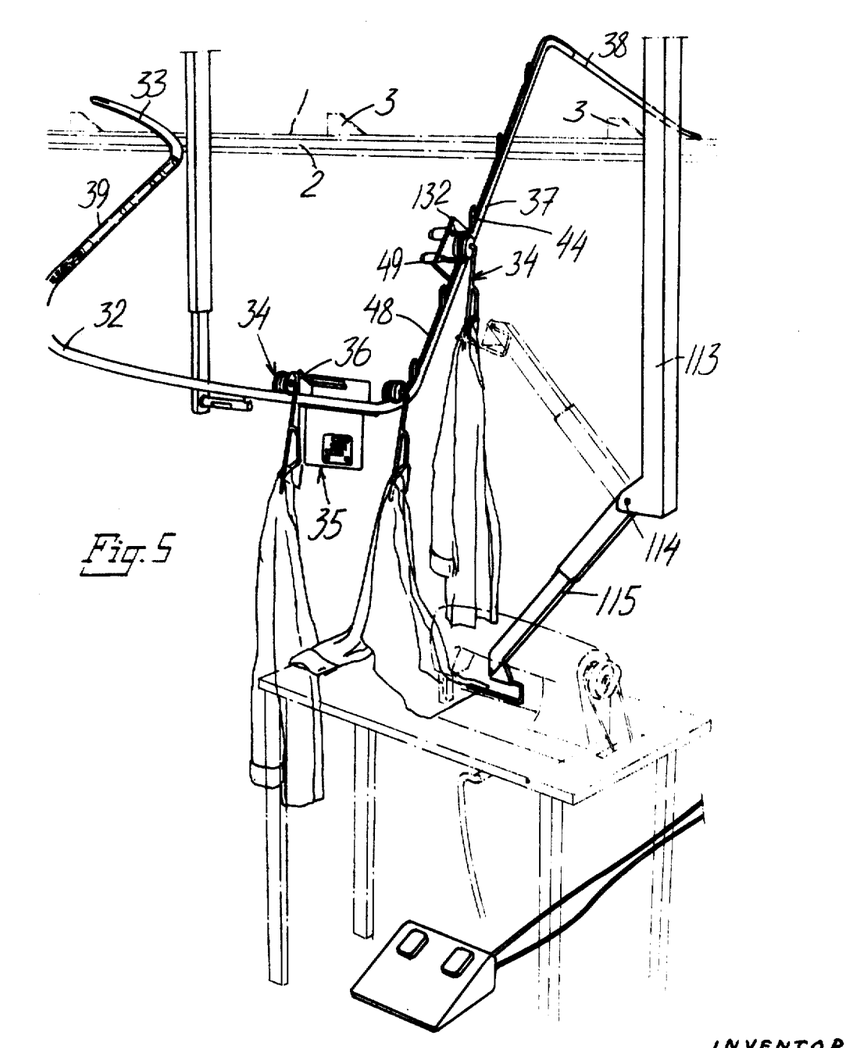
FIG. 5 shows in perspective a working station.
Figures 6, 7:
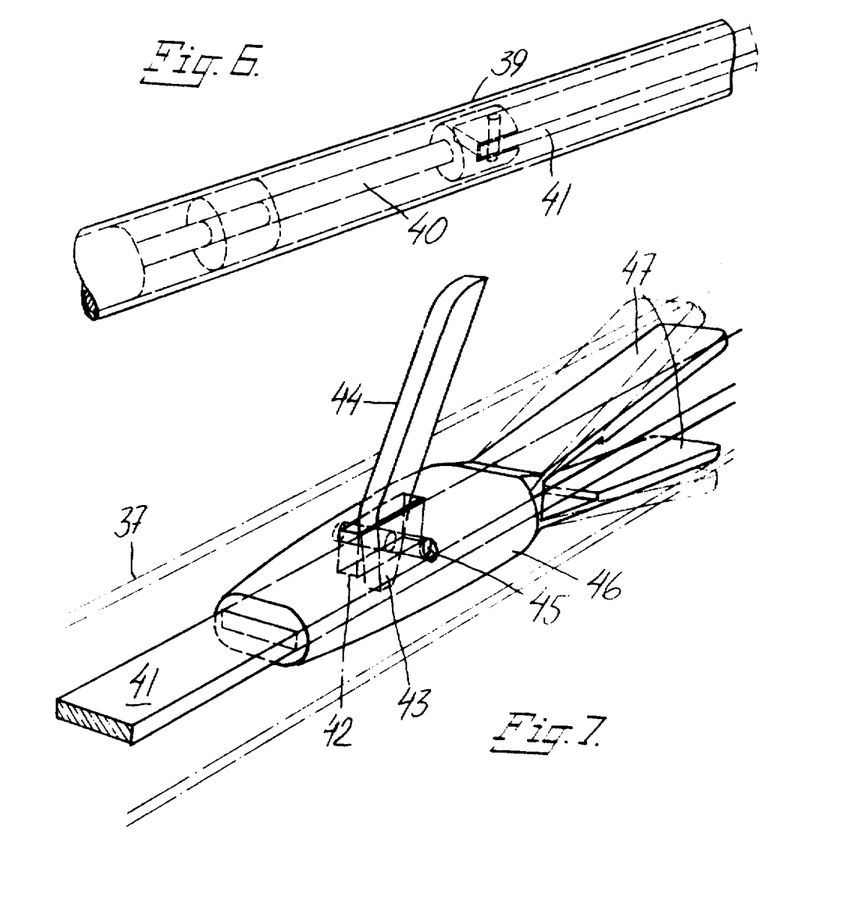
FIG. 6 shows in an enlarged scale a section through a portion of the drive for a second line.
FIG. 7 is an enlarged perspective view of an element of the drive.

Second lines may cooperate with the main line or lines just described as shown in FIG. 5, which shows a working station in a production line, used for manufacturing shirts. The second line according to this figure includes a first section 32, which forms a chute in the shape of a tube, which extends obliquely downwards from the main line and in its upper end terminates in a turnable unloading arm 33, which in its upswung position permits roll-bearing carriers 34, which have been transported by the main line and which will be described and shown in FIGS. 8—12 to pass behind but in its lowered position catches the carriers such that they by gravity may slide downwardly along the section 32 until they are caught by a catch 36, adapted at the entrance of a so called address apparatus 35. The section 32 continues in another upwardly sloping section 37, which in its upper end terminates in a turnable loading arm 38. A part of the section 32 consists of a pressure medium operated cylinder (39 FIG. 6,) which consequently has the same outer diameter as the tube 32 and to the plunger 40 of which is secured one end of a belt 41, made from a flexible but relatively stiff material such as acetal plastic or the like and which in regular intervals has openings 42, in which are received the lower portions 43 of feeding dogs 44, which by means of shafts 45 are pivotably connected to slide structures 46, which are also preferably made from acetal plastic or the like and which are provided with resilient tongues 47. The feeding dogs protrude through and are guided in a longitudinal slot 48 in the tube 37. Owing to the fact that the tongues 47 contact the interior wall of the tube 37 with friction the sliding structures are given such a friction, that the feeding dogs 44 raise when the belt 30 is moved in one direction and are retracted into the tube 37 when the belt is moved in the opposite direction without the use of any return springs or the like. It is apparent, that the carriers by means of the pressure medium operated cylinder may be fed alongside the section 37 upwardly. The catch 36 is of course adapted to free a carrier during this feeding operation. When the length of the section 37 exceeds the piston stroke of the cylinder or when it is desired to bring an object in cooperation with the carrier 34, a spring loaded catch 49 is adapted to prevent a carrier, which has been moved up a certain distance on the section 37 to slide back. A carrier arrested in the described manner may of course by the next stroke of the piston be transported up to and beyond the upper point of the section 37, from which it by means of gravity may reach the main line via the loading arm 38. Utilizing these construction characteristics a relatively great number of carrier may thus by means of the second line, shown, be directed into a working station and from there one at a time brought back to the main line after having been treated. In the following will be described how the carrier may be automatically directed between the different stations. According to the invention the carriers 34 are for this purpose provided with adjustable operating means, which by means of a so-called address apparatus may be set in a certain manner, whereupon the setting may be sensed in sensing stations, which the carriers pass.

The carrier, shown in FIGS. 8—12, includes a rod 50, provided with a second leg 51, such that a downwardly open fork is obtained. To the latter leg is at 52 pivotably connected a clamping element 53, which by means of a spring 53a normally is held in a position, in which it closes the fork opening by contacting the rod 50 with a portion 54.

Figures 8, 9, 10, 11, 12:
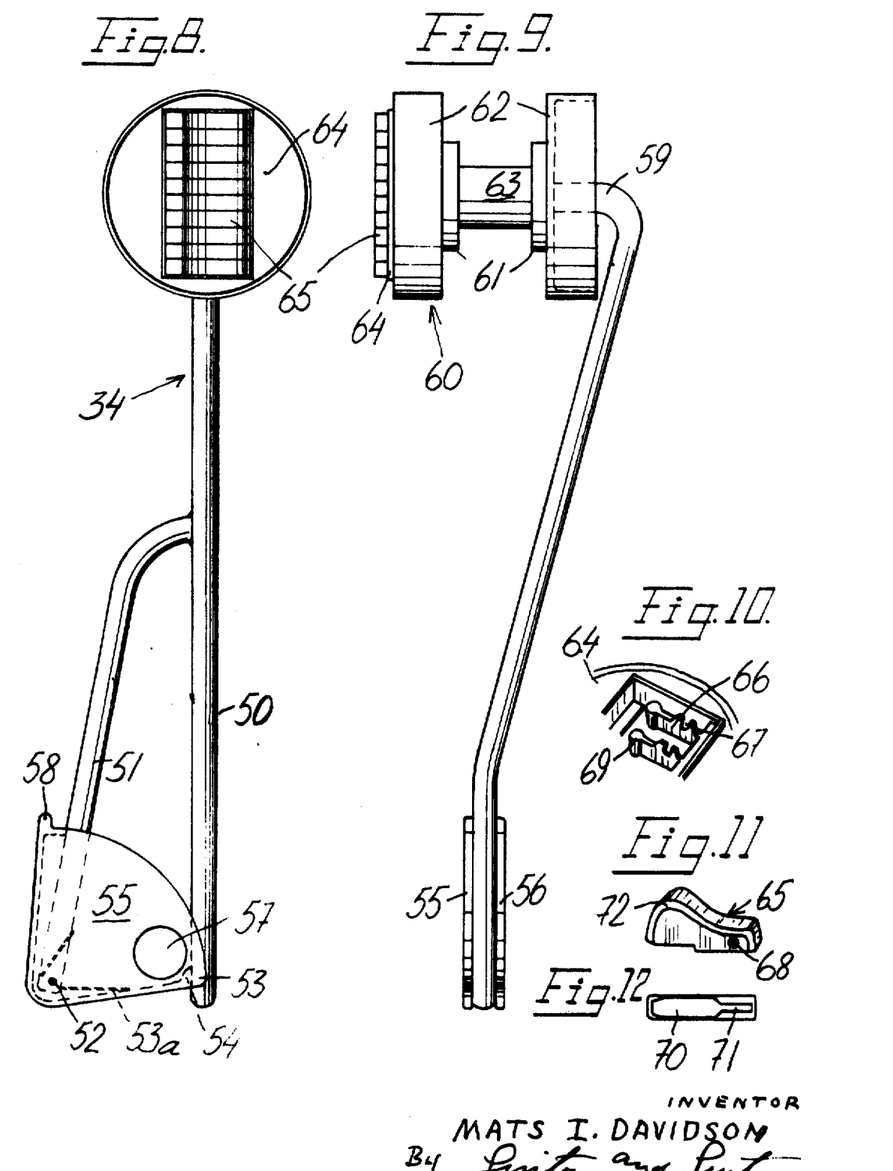
FIG. 8 is a side view of a carrier to be transported by the conveying device.
FIG. 9 is an end view of the carrier.
FIG. 10 is a perspective view of a portion of the address section of the carrier.
FIG. 11 is a perspective view of an address element of the address section.
FIG. 12 is a bottom view of the address elements of the address section.

The clamping element, which as shown in FIG. 9 with its sidewalls 55 and 56 surround the legs 50 and 51, are in these walls provided with a through hole, through which may be inserted some suspending element such as a garment hanger hook. The clamping element is also provided with a projection 58 for a purpose to be explained. The rod 50 is in its upper portion bent to a pivot 59 for a roller 60, which has inner flanges 61, contacting the conveyor tubes, outer flanges 62 and a hub portion 63. To the pivot 59 is fixedly connected a stationary element 64, which carries the operating elements in the form of keys 65, which form the address section of the carrier. The stationary element may preferably be injection molded in a plastic material and may comprise upstanding walls 66, each provided with a groove 67 for receiving an axis, (not shown) passing through holes 68 in the keys and may also be provided with a preferably downwardly tapering reinforcement 69 to act with friction against the walls of the keys, the thickness of which is illustrated in FIG. 12. Owing to these characteristics the keys may remain without the use of any detent means in, alternatively, a position, in which the actuating portion 72 of the same is depressed or in a position, in which it projects.

In order to easily operate the keys and thus determine the destination of the carrier in question, an address apparatus is adapted according to FIG. 5, the structure of said address apparatus being illustrated more in detail in FIGS. 13—16. The entering catch 36, which has been indicated in FIG. 5 and the purpose of which is to prevent a carrier to enter the address apparatus by gravity, may consist of a spring loaded yoke or a catch according to FIG. 14, which latter may also be used when a great number of heavy carriers are apparent on the line section 32. This catch includes a crank arm 74, pivotally arranged about a shaft 73 and held in the shown position by means of a coil spring 75, thereby resting with a yoke-shaped portion 76 against an abutment 77 and with another arm portion 78 against the dent 79 of a release arm 81, pivoted at 80 and held in the position shown by means of a compression spring 82. A carrier, the flanges of which have been caught by the yoke-shaped arm portion 76 is prevented from passing as the crank arm is locked against swinging in an anticlockwise direction and following carriers may not operate the release arm 81, as the latter is situated intermediate the flanges 62. A release action may only take place in connection with the mechanical feeding by means of the feeder dogs 44 and such feeding action causes the carrier, held by arm portion 76 to be pushed into the address apparatus.

Figure 13:
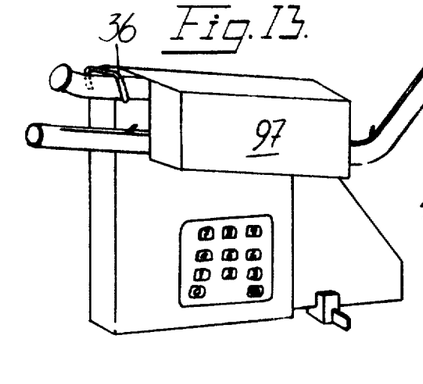
FIG. 13 is a perspective view of an address apparatus.
Figure 14:
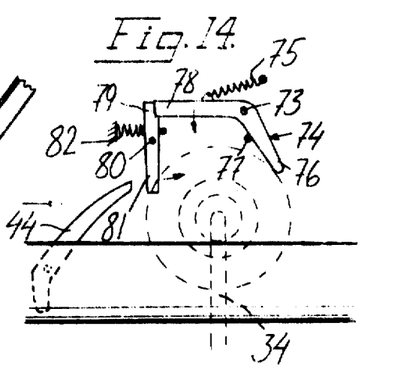
FIG. 14 shows diagrammatically a latch arrangement.
Figure 15:
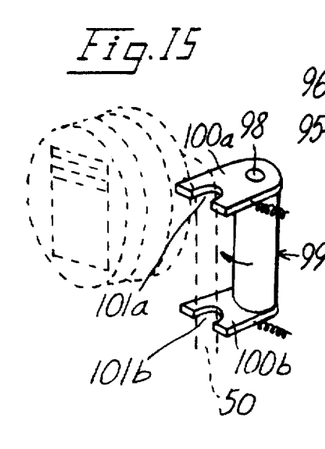
FIG. 15 shows diagrammatically a means belonging to the address apparatus and serving to hold the carrier during the addressing operation.
Figure 16:
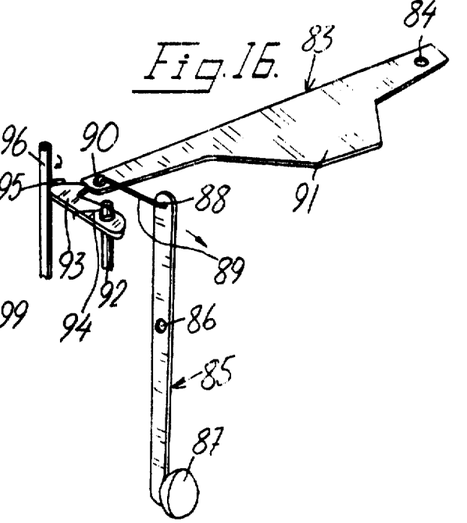
FIG. 16 shows diagrammatically and in perspective how the keys of the keyboard of the address apparatus may control the actuating members of the apparatus.
Figures 20, 21, 22, 23:
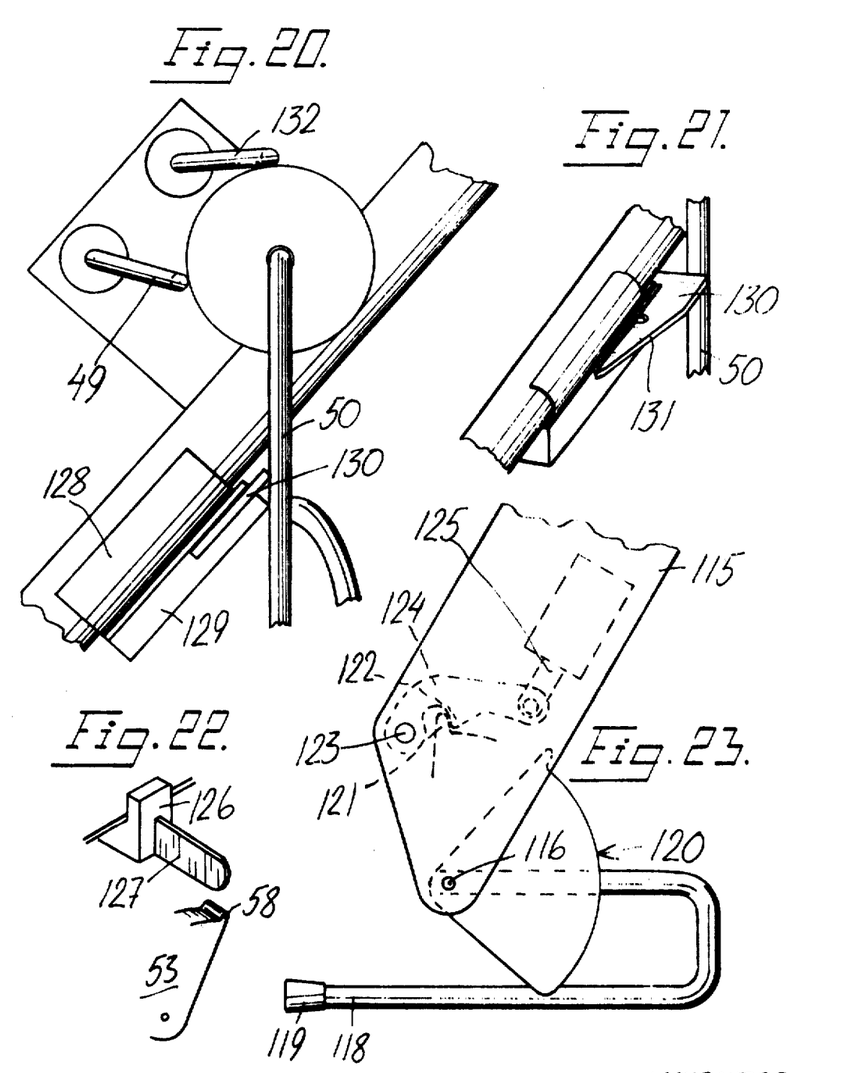
FIG. 20 is a side view of a carrier in a position, in which an object may be mechanically introduced into the carrier.
FIG. 21 shows a detail of the device.
FIG. 22 shows also in perspective, a device for opening the carrier by means of remote control.
FIG. 23 is a side view of a part of a means for mechanically transferring an object or detail to a carrier.

In this one a plurality of actuating elements 83 are pivotally adapted relative to a common axis 84. These actuating elements are operated by means of key arms 85, which are pivotally adapted in relation to an axis, which penetrates bearing openings 86 in the key arms and which is preferably obliquely arranged in order to compensate for the different distances between the keys 87 and the actuating members in question. In their upper ends the key arms 85 are provided with holes 88, in which are received bent portions of connecting elements 89, which with a second bent portion protrude through an opening in the actuating elements 83. By depressing a key the corresponding actuating element will thus be swung so that its operative portion 91 will project outwardly such that it may depress a corresponding key 65 of a carrier 34. In order to secure the actuating elements in their set position a number of catches 93 are pivotally adapted about a common axis 92, said catches being each influenced by a coil spring 94 to resiliently press against one end of the actuating elements 83 such that the catches may drop in behind the free end of the actuating elements 83 when the latter have been brought to their active positions. It is seen that every carrier, which passes the address apparatus 97, will receive the address, set upon the keyboard. To release the catches 93, i.e. for setting a new address, resetting elements 95, secured to a vertical axis 96, are given a movement in the direction of the arrow by means of turning the axis 96, which causes all catches to be reset and the spring loaded actuating elements 83 to return to their initial positions. In the section 32, preferably in the address apparatus are arranged means for pressing down all of the keys 65 of the carriers, which pass the section in question such that they occupy their normal inactive position and consequently will receive the new address, indicated by the actuating elements 83. In the section 97 of the address apparatus there is an axis 98, which like the rod 50 of the carrier is obliquely arranged and upon which is rotatably mounted a structure 99, provided with an upper support plate 100a and a lower support plate 100b, each having a notch 101a respectively 101b. This structure is held in the position shown in FIG. 15 by means of coil springs 102 and it is apparent that a carrier, which is fed into the address apparatus and the rod 50 of which reaches the notches 101a, 101b will turn the structure 99 in the direction of the arrow in FIG. 15. The structure will thereby be steadily pressed against the actuating elements when they pass the operation portions 91 of the same. In order to transfer carriers from the second line to the main line by means of the loading arm 38 it is necessary that there is no carrier in front of the feed dog in the main line, which is intended to feed the actual carrier. For this purpose there is arranged according to FIG. 17 adjacent the main line a so-called loading apparatus 103, which will be described but which has a retractable element 104, against which is resting an arm 105, projecting from the loading arm 38. The loading arm 38 is provided with an extension 106, which is guided in the tube 37 and comprises two pins 107 and 108, which protrude through openings 109 and 110 respectively in the tube 37. These pins 107 and 108, which are angularly spaced and located at a distance from each other, which is dependent of the distance between two carriers, will free or arrest the carriers dependent upon the angular position of the loading arm 38. In the position shown and in which the projecting arm 105 of the loading arm is supported by the element 104, pin 107 will arrest the carrier behind itself while pin 108 is in its nonarresting position. It is obvious that a carrier may reach the main line only if the element 104 has first been retracted. When this has occurred the loading arm 38 swings to such a position that the pin 108 will instead come into stop position to prevent more than one carrier passing. The loading apparatus 103 will be more specifically described in connection with FIG. 28. Even the unloading arm 33 may according to the invention be provided with stop or arresting elements for preventing an overloading of the second lines. For this purpose there is at the unloading arm 33 provided an abutment 111, which in the normal upswung position of the unloading arm has the position shown in solid lines in FIG. 18. When the unloading arm 33 is swung to its active position the abutment 111 is moved to the position shown in dotted lines. If however a carrier should be within the action area of the abutment 111 during this swinging movement, said abutment will prevent the swinging movement to be completed by abutment against the inner flange 61 of the carrier, which causes said arm to remain in its inactive position, which in turn leads to the carrier in question being transported around the main line and being transferred to the chosen second line when there is not another carrier within the aforementioned action area of the abutment 111. To prevent the carrier from being tilted in an unwanted manner as a consequence of the striking effect urged by the abutment 11, there are preferably arranged upper guides 112 for the carrier. As will be apparent from FIG. 5 the new conveying device also offers the possibility of mechanically bringing an object in contact with the carrier. For this purpose there is a preferably downwardly directed vertical column 113 pivotally connected by means of an axis 114 to a preferably downwardly directed extensible lever 115, which according to FIG. 23 has in its lower end a shaft 116, about which is pivotably mounted a yoke 117, the one leg 118 of which is extended and comprises a shoe 119, and a catch 120, which preferably is constructed like the catch 53 of the carrier. The catch 120 has a projection 121, which—as indicated in dotted lines—may be arrested by means of a stop pin 122 on a latch arm 124, pivotable about an axis 123 and operated by means of an solenoid 125 or the like. In this position the catch 120 is inactive and mainly retracted into the lever 115. To make it possible to fold a workpiece, which is of importance in the production of clothing, the operator has in addition to the just described possibility to mechanically introduce an object, in this case, for example, a cloth piece to a shirt, into the carrier and also free another end of the same object from its carrier. This is achieved by means of the device, shown in FIG. 22, which according to FIG. 13 preferably is secured to the address apparatus 97. The device comprises a holder 126 in which is slidably adapted an arm 127, which is intended to come into contact with the projection 58 of the catch 53. The arm 127 may be operated by means of an electromagnet or the like via an impulse from a pedal or the like, operated by the operator. At this time the carrier in question must of course be near the arm 127, i.e. as shown in FIG. 13 at the end of the address apparatus. By means of the lever 115 it is possible to introduce an object in the carrier 34, which has been transported upwardly on section 37 and rests against the catch 49, FIG. 5. In order to achieve this mechanical introduction it is important that the carrier is properly fixed during the introduction. For this purpose a rest 129 is fixed by means of a yoke 128 to the tube 37 and a guide plate 130 with a sloping edge 131 is pivotably connected to the same. The guide plate 130 is normally held in the position, shown in FIG. 21, by means of a spring—not shown—but this weak spring permits the plate 130 to swing away upon the passage upwardly of a carrier. When however the carrier has reached the position shown in FIG. 20 the plate swings back behind the rod 50 of the carrier and keeps thereby the carrier fixed against swinging movements. In order to prevent the carrier from being lifted up from the tube by inserting the object into the same, a spring loaded yoke 132 is adapted to act upon the flanges 62 of the carrier, approximately over the rod 50. When the free end of the cloth piece, which is suspended by the carrier, which is in position for operation by means of the arm 127, is introduced into the yoke 117 the operator sends an impulse to the solenoid 125, which causes the catch 120 to swing down to the position shown in solid lines in FIG. 23. The aforementioned end of the cloth piece will then be held by the gripper portion of the lever 115 and its opposite end may be freed from its carrier by means of an impulse, operating the arm 127. When the lever 115 is swung upwardly the yoke 117 will open the catch 53 of the carrier, shown in FIG. 20 at the same time as the catch 120 will be swung away to its dotted position in FIG. 23 and the cloth piece will be grasped by the catch 53. Thereupon the yoke 117 of the lever 115 slides out of the carrier and the lever returns to its lower ready position.

Figure 24:
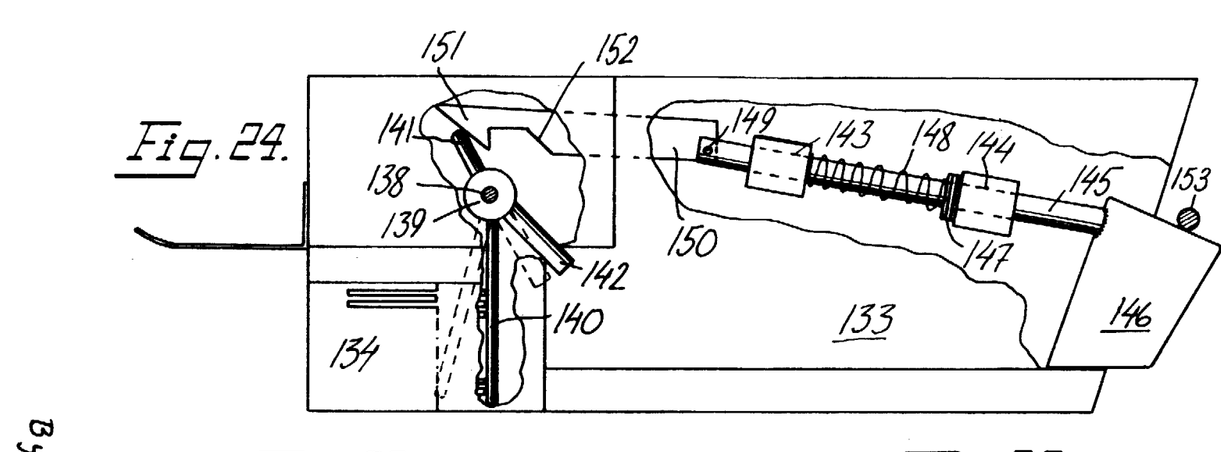
FIG. 24 illustrates a sensing apparatus, partly in section.
Figure 25:
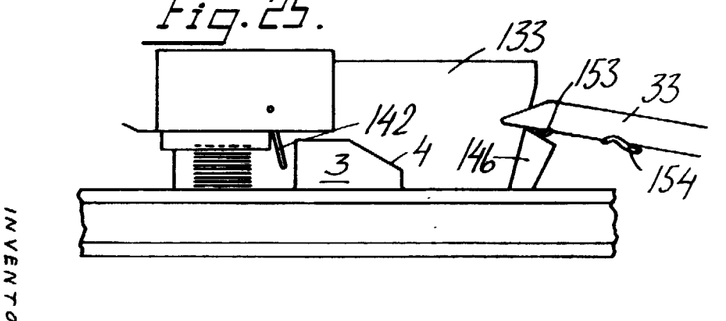
FIG. 25 shows the same apparatus in a side view and with an unloading arm in an inactive ready position.
Figure 26:
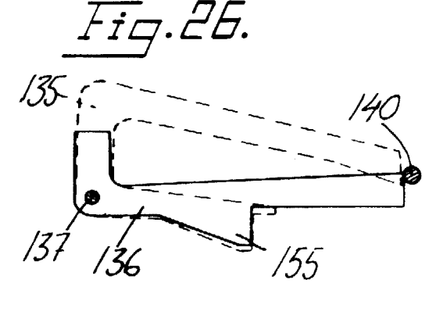
FIG. 26 is a plan view of two sensing elements in a nonoperated position.

In order to direct the carriers, transported in the main line to the second lines, which are indicated by the codes of the carriers there is arranged in connection with each second line a sensing apparatus 133, the principal structure of which is shown in FIG. 24. The sensing apparatus or sensing station is thereby so arranged adjacent the main line that the carriers, transported on the main line, will operate the address unit as they pass the same. The address unit comprises a block 134, provided with slots, in which sensing plates—seen in a plan view in FIG. 26—and designated 135, and 136 are pivotably mounted about a common axis 137. About a horizontal axis 138 is rotatably mounted a hub 139, which carries a downwardly directed pin 140, which normally rests against the outer ends of the sensing plates as seen in FIG. 26 as well as an upwardly directed arm 141 and an obliquely downwards directed arm 142 for each flange 62 of the carriers. It may be noted that the pin 140 and the arm 141 are located behind the arms 142, i.e. within the address unit, as will be apparent from FIG. 25. In the unit is a rod 145 slidably arranged relative to a pair of fixed guides 143 and 144 and said rod comprises in its free end an operating plate 146. A spring 148, arranged between the guide 143 and a flange 147 of the rod 145 tends to hold the rod in the position, shown in FIG. 24. In its opposite free end the rod is at 149 hingedly connected to a catch 150. This rod has a dent 151 as well as a sloping surface 152 for a purpose which will be later explained. As will be seen in FIG. 25 the unloading arm 33 is provided with a welded on bent rod 153, which may rest against the operating plate 146 and also a second, bent rod 154, intended to cooperate with the flanges of the carrier in a manner to be described.

The sensing apparatus just described works as follows:

The carriers pass the sensing apparatus and in doing so their actuating members 65 influence the portions 155 of the sensing plates. The actuating members, which have been operated by means of the operating elements of the address apparatus will then operate the correspondingly located plates 135 and 136. As the latter are of two different types it is seen that the pin 140, FIG. 26, may be displaced to the left in FIG. 26 only when the plate 135 as well as the plate 136 has been actuated and it is obvious that a two-digit code will be suitable for the purpose. The carriers, which have a code, which does not correspond to the code set in the sensing station will be course pass the sensing station without interferring with the same otherwise than in the sense that the arms 142 will be swung anticlockwise, whereupon they by means of gravity return to their initial position. If however a carrier, bearing the same code as the sensing apparatus passes the sensing apparatus its actuating elements will first generate an opening between the sensing plates, which will permit the pin 140 to swing to its dotted position in FIG. 24. This swinging movement may be obtained by means of the weight of the assembly 139—142 or by means of a weak spring. During the swinging movement the arm 141 will ride over the sloping portion of the dent 151 and the dent will consequently drop down behind the arm in question. At the continuing feeding of the carrier its flanges 62 will turn the arms 142 in an anticlockwise direction. As the dent 151 is now in engagement with the arm 141, the rod 145 with its actuating plate 146 will consequently, against the action of the spring 148, be displaced to the left in FIG. 24. When the actuating plate has been so far retracted that it is positioned to the left of the rod 153 of the unloading arm 33 these two elements will swing down by means of gravity to their ready position. The carrier will therefore be fed up on the unloading arm 33 and during the continued feeding the sloping edges 4 of the dogs 3 will act upon the rods 154 of the unloading arm. When the actual feed dog abuts against rod 154 its unloading arm will be lifted up such that it again falls down towards the upper surface of the actuating plate 146. The actuating plate has during the meantime returned to its initial position as the arm 141 owing to the arrangement of the catch passes the dent 151 at the end of the anticlockwise swinging movement of the arm 141. All the elements of the sensing apparatus have thus reached their initial positions and the apparatus is consequently adapted for repeatedly functioning as described above. The carrier leaves the unloading arm 33 and the adjacent section by means of gravity.

Figure 27:
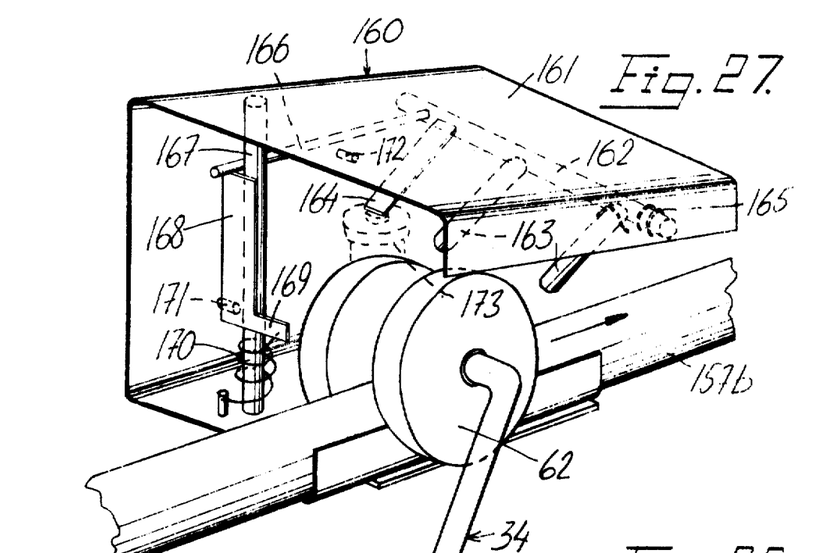
FIG. 27 is a perspective view of a latch arrangement in a buffer line.
Figures 29, 30:
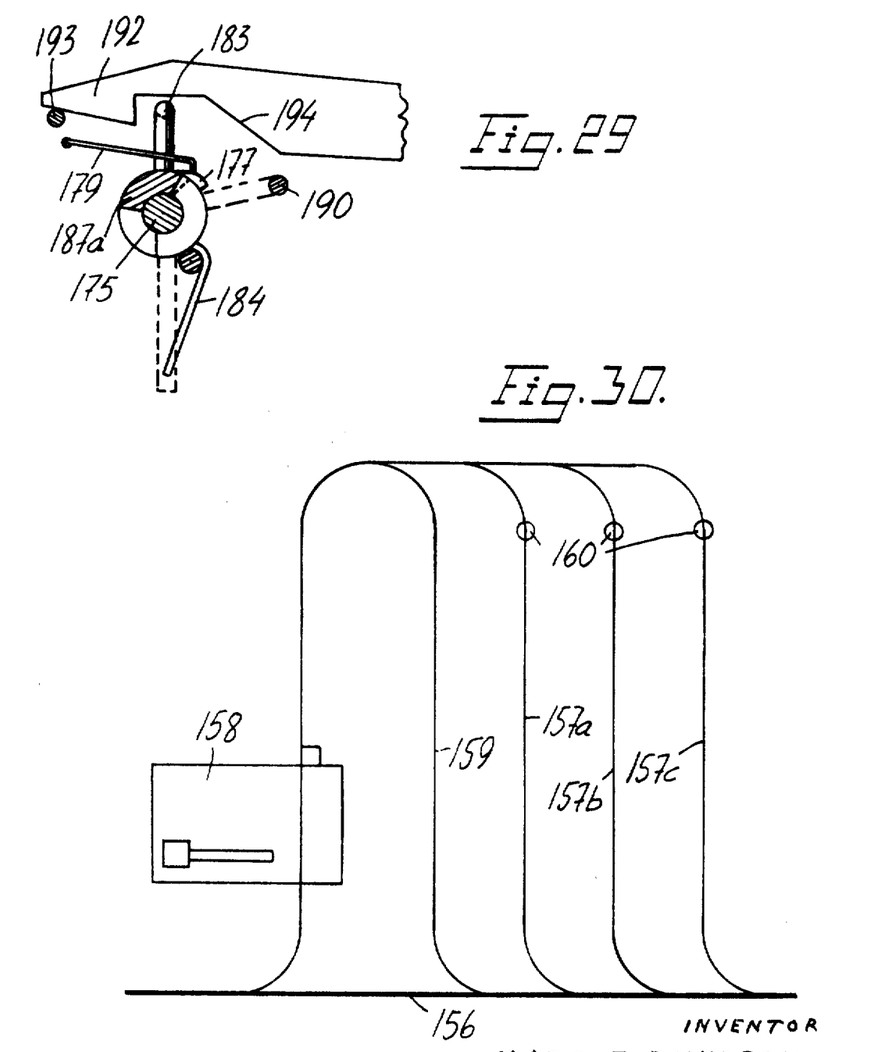
FIG. 29 is a section taken on line XXIX—XXIX in FIG. 28 with the latching elements in a released ready position.
FIG. 30 is a plan view of a working station, connected to a main line by means of buffer lines.

In connection with certain manufacturings, especially in garment manufacturing, it is desirable to be able to transfer cloth pieces from one or more stations, in which the cloth pieces, belonging to a specific cloth are sorted according to size, color or the like, to the different stations in such a manner that the cloth pieces, belonging to the same bundle after having been treated in different stations may be collected in assemblage stations, where the cloth pieces are connected to each other without any interference occurring. This very important effect is according to the invention achieved such that certain of the working stations are provided with one or several buffer lines leading from the main line, to which the different groups of carriers are directed and in which they are arrested until the operator gives an impulse, permitting the cloth pieces to arrive to the actual working station. FIG. 30 shows diagrammatically how an arrangement of this character may be realized. To a main line 156 are connected by means of sensing apparatus of the kind referred to a number of second lines 157a, 157b, 157c, which will be hereinafter named buffer lines, and a direct line 159, leading direct to the working station 158. In each buffer line is arranged a stop mechanism 160, the construction of which will be apparent from FIG. 27.

The stop mechanism 160 includes a cover 161, secured to a buffer line and in which is rotatably mounted a horizontal axis 162, to which are secured two stop levers 163 and a lift arm 164. By means of a torsion spring 165 the axis is urged in an anticlockwise direction such that a rod 166, secured to it will abut edge of a stop plate 168, which is connected to a vertical shaft 167, and its lower end is provided with a transverse tongue 169. The shaft 167 is vertically arranged in the cover and is under tension of a spring 170, which urges it to turn such that the stop plate 168 will abut against a stop pin 171, secured to the cover. To the latter is also secured a stop pin 172 for limiting the swinging movement of rod 166 and an electromagnet of the pushing type—only indicated. The first carrier of a group, which is to be directed to a buffer line is provided with a special code in addition to the code for the number of the line, preferably the numeral zero. This code is like the ordinary addressing code obtained by means of actuating one of the actuating elements of the carrier, in this case the one bearing number zero. The actuating element in question is in level with the tongue 169 and the actuating element will therefore actuate said tongue when the carrier arrives to the stop mechanism. In the illustrated initial position the stop levers 163 are in a position, in which they permit carriers to pass the stop mechanism. When however a carrier bearing the code zero arrives to the stop mechanism its zero actuating member actuates the tongue 169, which causes the stop plate 168 to move in an anticlockwise direction such that the rod 166 will be free from the upper edge of the plate 168. The spring 165 now turns the axis 162 and the stop levers 163 and the lift arm 164, connected to said axis in an anticlockwise direction until the rod 166 rests against the stop pin 172. In this position the stop levers are in their active, stopping position and the group of carriers will consequently be prevented from passing through the stop mechanism. When the operator wishes to receive a group of carriers, arrested by a buffer line, he only operates a switch or the like for activating the pushing magnet 173, which thereby pushes the lift rod and the axis 162 up to the illustrated initial position in FIG. 27. All the carriers of the group may now pass through and the mechanism is at the same time ready for a new functioning.

Figures 17, 18, 19:
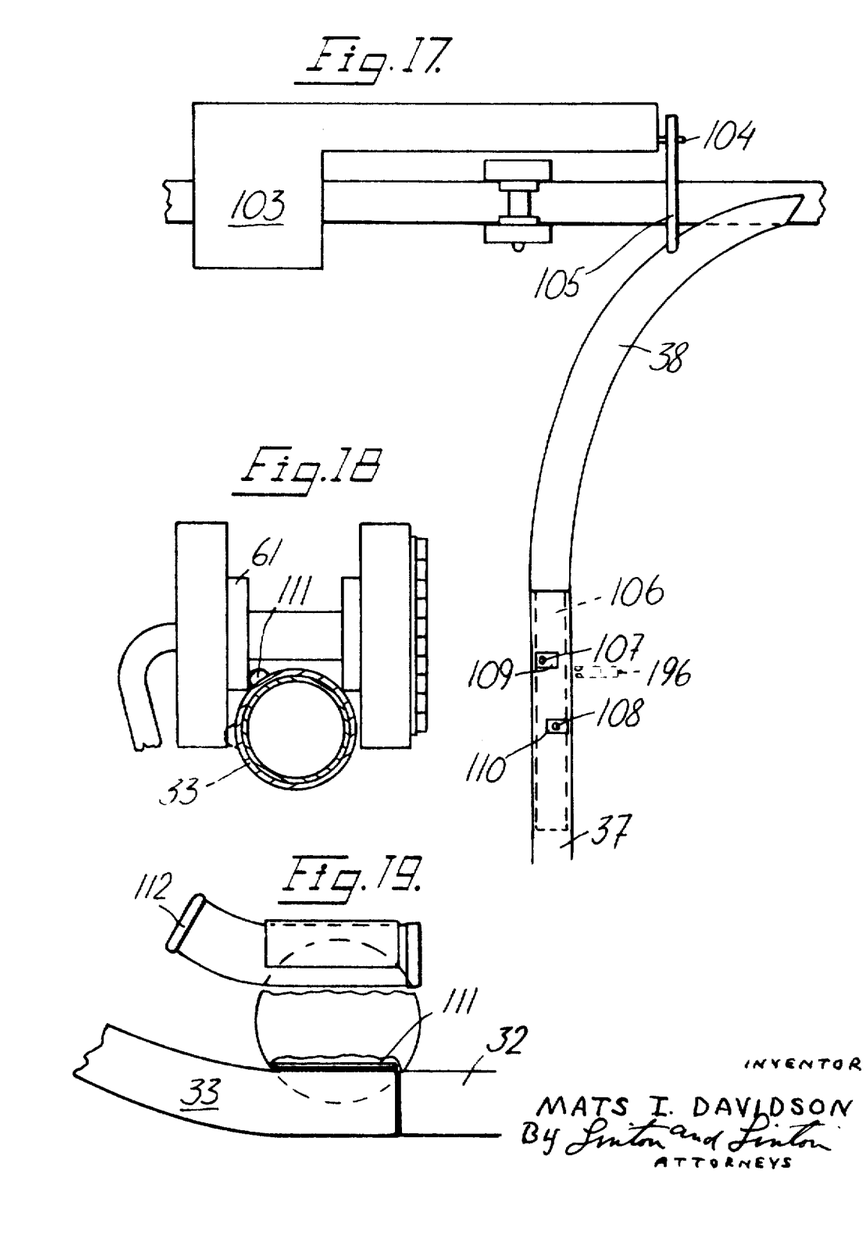
Figure 28:
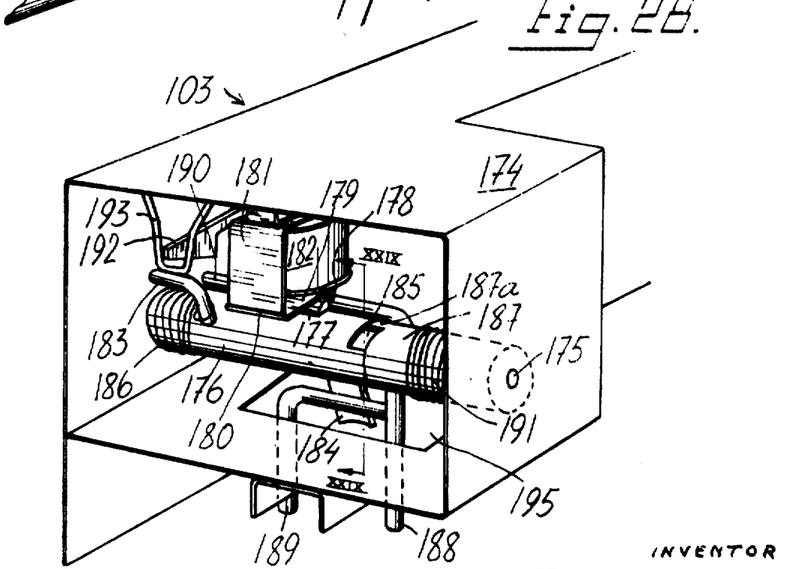

As mentioned in connection with FIG. 17 the feeding down of carriers from the loading arm 38 may only occur when the element 104 has been retracted and this retraction is only to occur when there is no carrier in front of the feed dog, towards which the feeding down is to take place. For this purpose the loading apparatus 103 is adapted to sense the presence of a carrier in front of a feed dog and the device for this purpose is shown in FIG. 28.

The loading apparatus comprises a cover 174 of essentially the same construction as the sensing apparatus 133. To this cover is secured a shaft 175, around which is turnable a sleeve 176, which is provided with a stop abutment 177 on its periphery. With this stop abutment may cooperate a hook-shaped portion 178 of a plate 179, which at 180 is hinged connected to another plate 181, secured to the cover 174. The plate 179 serves as an armature of an electromagnet 182. To the sleeve 176 is also secured an angular arm 183 and an obliquely extending tongue 184, which according to the figure is located so that it may be influenced by the hub portion of a carrier but not by the flanges of said carrier. The sleeve 176 is in its lower end provided with a notch 185, extending more than 180°. The sleeve is under the influence of a torsion spring 186, which tends to turn the same in a clockwise direction. About the shaft 175 is also another sleeve 187 adapted to be turned. Said sleeve has an axially extending portion 187a, which is received in the notch 185 of the sleeve 178 whereby a limited mutual movement between the sleeves is permitted. Secured to the sleeve 187 is a downwards directed rod 188, to which is fastened a L-shaped member 189 such that two parallel downwards directed legs 188 and 189 are generated. These legs are so positioned that they extend within the active area of the flanges of the carriers. The tongue 184 as well as the legs 188, 189 protrude through an opening 195 in the cover 174. To the sleeve 187 is also secured an arm 190, which in its portion, not shown, corresponds to the catch 150, which is shown in FIG. 24, is in the same manner connected to the means for retracting the actuating plate 106 as shown in FIG. 24. The actuating plate belonging to the loading apparatus bears however the numeral 104 according to FIG. 17. The catch 192 is in its forward end guided by means of a thread assembly 193, secured to the cover 174 and as will be apparent from FIG. 29 it is provided with a sloping surface 194.

The loading apparatus functions as follows: A carrier, which according to FIG. 17 arrives on line 37 and is arrested by means of the stop means 107 gives thereby an impulse to a microswitch, only indicated in FIG. 17, and this one activates in its turn the electromagnet 182 to drop its armature 179, which has until then retained the sleeve 176 in its inactive position, shown in FIG. 28 and in which passing carriers have only caused the legs 188 and 189 to make an oscillating movement every time a carrier passes. The sleeve 176 and the members 183, 184, connected thereto, will then swing down to the ready position, shown in FIG. 29, in which the presence of a carrier may be sensed.

If no carrier is present behind the feed dog, which first arrives to the loading apparatus the feed dog will swing the tongue 184 in an anticlockwise direction. The arm 183, which upon the activation of the magnet has slipped down behind the dent 192 thereby comes into contact with the same and the dent will consequently be moved to the left. The elements shown in FIG. 24 now cause the actuating plate 104 of the loading apparatus to be retracted, which in turn causes the loading arm 38, FIG. 17, to fall down and the feeding down of the carriers may take place as described in connection with FIG. 17. If however a carrier should be apparent in front of the feed dog, which first arrives to the loading apparatus, the legs 188 and 189 will be first swung in an anticlockwise direction. The arm 190 will thereby strike the sloping edge 194 of the dent 192 and bring the same into such a position, that arm 183, which moves in an anticlockwise direction because the hub of the carrier strikes the tongue, is prevented from coming in contact with the dent 192 and thus is not affected by the arm 183. In this case there does no occur any retraction of the actuating plate and consequently no loading takes place.

The invention may be varied in many respects without departing from the idea of the same. As was initially mentioned it might for example be suitable to use two main lines, situated one above the other, making it possible to direct carriers from one main line to the other. The upper main line may contain reserve carriers and by means of impulses such reserve carriers may be brought down to the places where they are needed while a surplus of carriers by means of impulse means may be brought up to the upper line. This one may also be used for the transport of so-called hasty works. Also in other respects the invention may be varied within the scope of the appended claims.

I claim:

1. A device for conveying objects such as semifinished products between different working stations in a transfer line with the possibility for the personnel at any of the different working stations to direct by means of a manual actuating of a keyboard a selected number of such semifinished products to other working stations in the transfer line, wherein said device includes carriers, gripper elements provided on each of said carriers, for looseably holding the objects, said gripper elements being movable along a continuously running main line covering the whole transfer line said carriers being able to be selectably transferred to branch lines each leading to a working station, sensing apparatus located at different positions alongside said main line, address elements on said carriers for controlling said transferring, said address elements being selectively adjustable and so located on the carriers that the latter by passing said sensing apparatus are sensed by said sensing apparatus, unloading elements capable of transferring said carriers to a given branch line, made operable during the sensing operation, and an intermittently feeding conveyor and loading elements capable of transferring said carriers to the main line from a working station.

2. A device as claimed in claim 1, wherein a stop member is positioned in relation to a branch line, said branch line leading from the main line via a working station to the main line and that said stop member serves to retain said carriers in a predetermined position and wherein an address apparatus is positioned for manipulating the address elements of said carriers in a manner to give said carriers a new address code and wherein feeding elements belonging to said conveyor are adapted to positively feed said carriers one at a time from said stop member to said address apparatus and from there to a loading element which latter serves to transfer said carriers to the main line.

3. A device as claimed in claim 2, wherein said carriers each have a roller with a flange, said stop member which is positioned in connection with the branch lines consists of a two-armed lever with a leg positioned for abutting against the roller flanges of said carrier, and a normally horizontal leg, a second lever having said horizontal leg normally resting thereon and being pivotally arranged within the action area of said feeding elements such that it will be pivoted by the latter, thereby causing the legs of said two-armed lever which abut against said roller flanges, to be moved away from said roller flanges.

4. A device as claimed in claim 1, wherein each of the branch lines includes a first section which from the main line leads obliquely downwards and is in the shape of a tube forming a chute, and a second section, directed obliquely upwards and also being in the shape of a tube, intermittently operated feeding members provided on said second section adapted to feed said carriers up to and beyond an upper turning point of said second section, a loading arm to which said carriers move from said upper point by gravity by means of which they may be transported to the main line.

5. A device as claimed in claim 4, including a slot in said second section, a pressure medium operated cylinder constituting a part of said obliquely upwards directed tube of the branch line and a belt moveable by a plunger of said cylinder and which belt is guided in said tube, and a plurality of feed dogs on said belt projecting through said slot.

6. A device as claimed in claim 5, including sliding structures having said feeding dogs pivotally connected thereto and having friction elements for cooperation with the interior of said tube and wherein the lower portion of each feeding dog extends through an opening in the belt which latter is displaceably arranged relative to said sliding structures such that said feeding dogs will be lowered and raised upon engagement with the edges, which limit said opening.

7. A device as claimed in claim 2, wherein said address apparatus is provided with a plurality of actuating members, keys of a keyboard for operating said actuating members, said actuating members being lockable in their set position and serving to actuate the address elements of said carriers when the latter pass said address apparatus and releasing elements for releasing said actuating members from their locking position.

8. A device as claimed in claim 7, wherein said address apparatus includes a pivotably arranged pressing member, which is actuated by the passing carriers such that it is pivoted during the passage of said carrier in question and thereby serves to press said carrier against said actuating members 9. A device as claimed in claim 1, wherein the main line includes a conveyor belt, having feeding perforations and dogs, a grooved member, extending in a endless path and guiding said belt, two synchronously driven sprockets, cooperating with said belt feeding perforations, with one sprocket engaging one part of said belt and the other sprocket engaging the other part of said belt, such that said belt will be under the influence of a pulling as well as a pushing force.

10. A device as claimed in claim 1, wherein each carrier consists of a rodlike element which at its lower end is fork shaped, a roller element having flanges, provided on said rodlike element, a pawl normally closing said fork which is pivotably connected to one leg of said fork and intended to serve as a gripper element for looseably holding the object to be transported.

11. A device as claimed in claim 10, wherein said pawl at the end which is adjacent to the pivot point of said pawl is provided with a projection, and a remote-controlled arm is capable of manipulating said pawl projection.

12. A device as claimed in claim 10, wherein said pawl has an opening, in which a garment hanger hook or the like may be introduced.

13. A device as claimed in claim 1, wherein buffer lines are connected to some of the working stations in the transfer line and there is a device in each of said buffer lines to sense and direct into said buffer lines said carriers, addressed to the line in question and a device, activated by a code belonging to the first carrier in a group of carriers and including a stop member to arrest upon said buffer line the whole group of carriers and a releasing device, operated by the operator, to release when desired, said stop member so that all said carriers in the group move to the working station to which said buffer line is connected.

14. A device as claimed in claim 13, including pivotable loading and unloading arms at the ends of said branch lines 15. A device as claimed in claim 14 wherein the unloading arms by means of the sensing apparatus, which are arranged at different positions alongside the main line and which serve to sense the address of the carriers and the feed elements of the main line may be alternately brought up to an upper position, in which said arms do not act upon the carriers, or to a lower position, in which the carriers in question by means of the feeding elements of the main line are forced to move up on the loading arms.

16. A device as claimed in claim 14, wherein said unloading arm is in the shape of a tube, which upon its periphery has a longitudinally extending ridge, which by presence of a carrier on the tube and when the unloading element is in its upper position will prevent by abutment against the carrier said unloading arm from being swung down as long as the carrier is present within the area of said ridge.

17. A device as claimed in claim 14, wherein the conveyor has dogs each provided with a sloping edge, which serves to bring back the unloading arms to their upper, inactive position.

18. A device as claimed in claim 13, including a pair of arms, a spring-loaded catch which normally retains said pair of arms, a special actuating key of the first carrier in a group, intended to be fed to a buffer line, is adapted to actuate said spring-loaded catch, which acts against the carrier in an inactive position such that said pair of arms is released and occupy a stop position, in which it prevents the passage of said carriers, and in which a remotely controlled means is adapted to bring back at will the pair of arms to its initial position.

19. A device as claimed in claim 1, wherein the address element of each carrier consists of a plurality of operating arms, adapted to be pivoted between two end positions and being provided with actuating portions, which in one of the end positions of said arms project more from its carrier in an axial direction than they do when the arm in question is in its other end position and wherein said arms are adapted to be looseably arrested in their actual end position.

20. A device as claimed in claim 1, wherein a bar is adapted to be pivoted such that its lower end portion from a lower position adjacent to a working place may be swung up towards a carrier arrested in the branch line leading to the working place, that a U-shaped yoke is pivotably connected to the lower end of said bar and that a clamping element to be activated by the operator, may be released so that it, from an upper inactive position, will swing down and come into contact with said yoke to grasp an object, for example a cloth piece and that said clamping elements when said bar is swung up towards the arrested carrier may enter into the same to deliver the objects to said carrier.

21. A device as claimed in claim 1, wherein said loading arms which are curved and obliquely downwardly directed from the branch lines and intended to transfer said carriers from the actual branch line to the main line, are turnably arranged relative to the branch line and that each of the loading arms has two stop pins, located on a distance between each other peripherically as well as axially such that the rear stop pin when the loading arm is swung down stops said carriers behind said stop pin while the front stop pin permits the foremost carrier to leave the loading arm and wherein the rear stop pin releases the carrier and the front stop pin stops the carrier when the loading arm is in its upper, normal position.

22. A device as claimed in claim 21, including a loading apparatus having a solenoid and an arm assembly, an impulse means connected to said solenoid and positioned near to one of said stop pins, said impulse means being operated by a carrier abutting against said stop pin in such a manner that an impulse is transmitted to said solenoid, said solenoid causing arm assembly of the loading apparatus to move to a ready position.

23. A device as claimed in claim 22, including a lever having a dent, the arm assembly includes retracting springs and two cages rotatable about a common axis and each being under the influence of one of said retracting springs, the first of said cages having an abutment element directed towards a carrier in the line and an angular arm, which normally rests against the dent of said lever and a shoulder by means of which the cage in question may be retained by aid of said solenoid in an initial position against the action of its retracting spring, the second of said cages having a pair of arms directed towards a carrier in the line and an operating arm axially directed towards said lever, the angular arm of said first cage being positioned behind the dent of said lever when said cage by means of said solenoid is in its ready position, the actuating of the cage by means of said conveyor and acting upon said abutment element causing said angular arm of said cage to move said lever a stop member, an overhead arm connected to said loading arm abutting against said stop member and releasable by said lever whereby said overhead arm may swing down to its active position while said lever is brought out of engagement with said angular arm, belonging to said operating arm by means of said operating arm, which is actuated by the influence of a carrier upon said pair of arms, thereby causing said operating arm to move such that it acts upon a bevelled surface of said lever to swing the same upwards such that the dent of the same will not be able to engage said angular arm.

24. A device as claimed in claim 1, wherein said unloading element has a projection, said carriers have operating arms, said sensing apparatus, provided at the main line and in connection with the branch lines, each comprise a support element, an arm assembly controlling said support element, a plurality of sensing arms adapted to come into contact with said operating arms of said carriers when the latter pass said sensing apparatus such that said sensing arms in case of concordance between the codes, constituted by said operating arms and said sensing arms of said sensing apparatus in question permit said element assembly to be moved from a position, in which it cannot operate said support element, belonging to the sensing apparatus and acting upon said projection of an unloading arm into a position, in which said element assembly when influenced by the carrier which has operated the sensing arm, cause said support element to move away such that said projection and consequently the entire unloading arm may move down to its unloading position.

25. A device as claimed in claim 24, wherein said arm assembly includes a pair of arms, a sensing pin, the movement of which is normally limited by abutment against said sensing arms and further arm, a catch connected to said support and having a dent contacted by said further arm but which further arm when the proper sensing arms have been operated, may fall down behind the dent in question such that said pair of arms in the arm assembly, which act against and are operated by said carriers when a carrier passes may bring with itself said catch so that said support element may be moved to an inactive position.

26. A device as claimed in claim 25, including said sensing arms pivoted about a common axis and that said sensing arms, belonging to the proper combination, are of two complimentary shapes, such that each of said sensing arms as well as both of the same may stop the movement of said sensing pin in a specific direction making it possible for said sensing pin to penetrate between the actual sensing arms only when both of said sensing arms have been moved into a specific position.